Dec. 11, 1956   R. B. ROBERTS ET AL   2,773,732
FIRING ERROR RECORDER
Filed Sept. 13, 1946   3 Sheets—Sheet 1
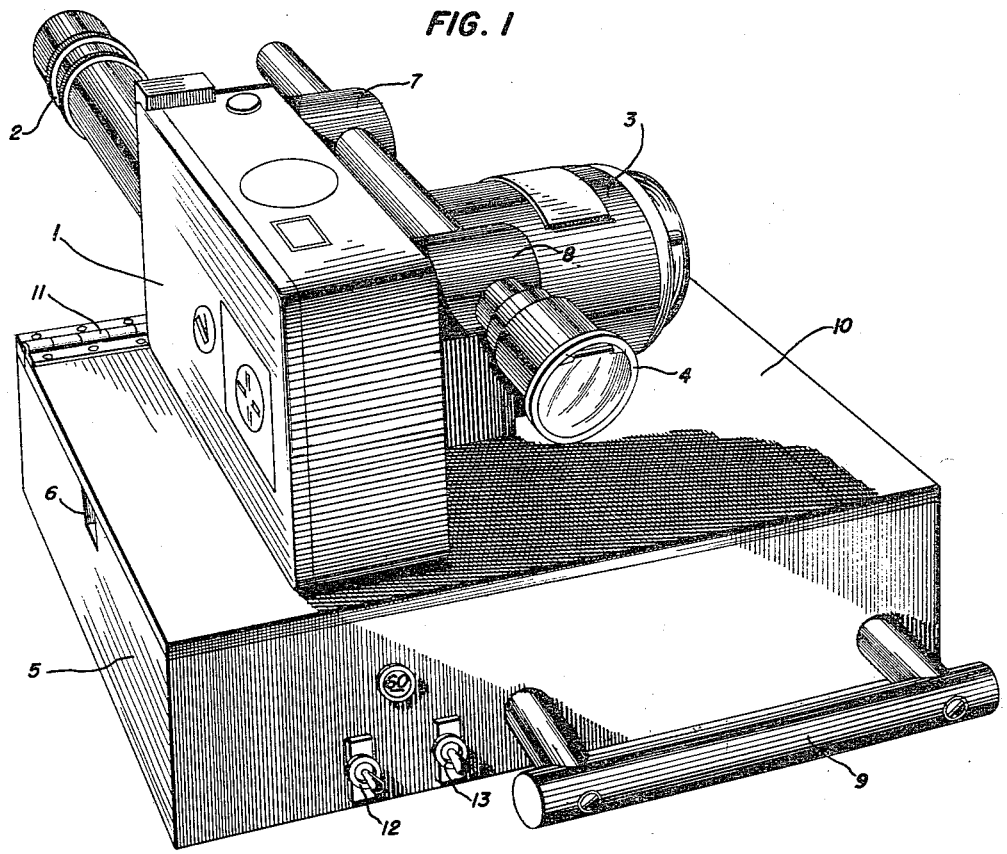
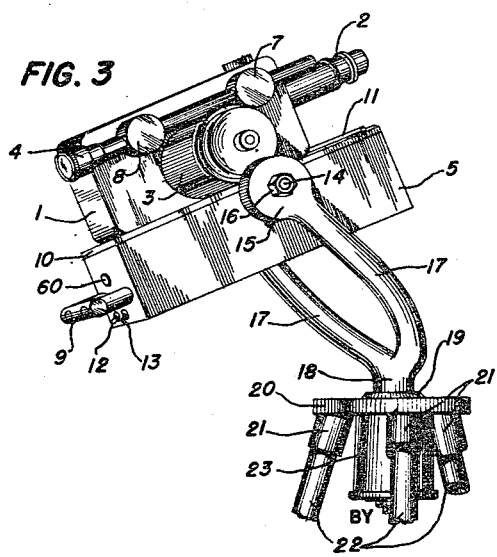
INVENTORS
RICHARD B. ROBERTS
ROBERT P. PETERSON
CLYDE T. HOLLIDAY
BY
ATTORNEYS

INVENTORS
RICHARD B. ROBERTS
ROBERT P. PETERSON
CLYDE T. HOLLIDAY

ATTORNEYS

Dec. 11, 1956

R. B. ROBERTS ET AL 2,773,732

FIRING ERROR RECORDER

Filed Sept. 13, 1946

INVENTORS
RICHARD B. ROBERTS
ROBERT P. PETERSON
CLYDE T. HOLLIDAY

BY

ATTORNEYS

United States Patent Office 2,773,732
Patented Dec. 11, 1956

2,773,732

FIRING ERROR RECORDER

Richard B. Roberts, Washington, D. C., and Robert P. Petersen and Clyde T. Holliday, Silver Spring, Md., assignors to the United States of America as represented by the Secretary of the Navy Application September 13, 1946, Serial No. 696,926

1 Claim. (Cl. 346—38)

This invention relates to apparatus and procedure for indicating firing errors in target practice. The result is achieved by using electrical and sound radiations which ultimately cause receiving apparatus to indicate how closely a projectile approaches a target.

One of the objects of this invention is to provide a method as well as apparatus for firing error indication by the use of which it will be possible to record accurately the course of a tracer bullet or shell with respect to a target, and thus the distance by which the bullet or shell, at its nearest point to the target, misses the target.

Another object of the invention is to provide a method as well as apparatus for firing error indication wherein the shock wave from a bullet or shell passing a target will modulate an oscillator in the target, and the modulated pulse from the oscillator will operate a camera connected with a radio receiver for recording on film the range of the target from the point of observation.

Briefly, the procedure upon which the invention is based comprises the steps of causing the shock wave due to the bullet or shell to act on an acoustically-sensitive device, such as a microphone, carried by the target, in order to obtain an electrical modulation signal that may be impressed on a carrier and transmitted to a distant receiver. The receiver is located at an observation station and the received signals "trigger" apparatus which records the range of the target from the point of observation thereof. The range parameter so recorded may be provided in any convenient way, as by means of radio direction finding and ranging apparatus (radar), one part of which may be located adjacent a gun, and includes a sighting means such as a telescope, in combination with a photographic camera, preferably of the motion-picture type, whereby the telescope may be directed to follow the target, the camera meanwhile making a photographic record showing said target and any bullet or shell within a certain angular distance thereof.

The camera may be operated by a constant speed motor, preferably a synchronous alternating current motor, to maintain the speed uniform.

Another part of the apparatus comprises a source of radio waves which may be carried in or near the target, together with means responsive to the shock wave for modulating said waves, so that thereby a signal may be emitted from the target and received at the camera location. This signal is fed into suitable means associated with the camera to cause the moving film to receive an image indicating the range of the target from the point of observation thereof at the instant the shock wave strikes it. This signal may also be fed to audible means, which will indicate by its intensity and tone the accuracy of the aim.

A third part of the apparatus is of a somewhat auxiliary nature, and comprises means for determining the range and transmitting it to the camera, and may include conventional devices, such as radar apparatus.

Other objects and many of the attendant advantages of this invention will be readily appreciated as the same becomes better understood by reference to the following detailed description when considered in connection with the accompanying drawings, wherein:

Fig. 1 is a perspective view of the camera and the sighting telescope, mounted on a case containing certain auxiliary apparatus;

Fig. 3 shows the camera and associated devices mounted on a tripod ready for use;

Figure 2:
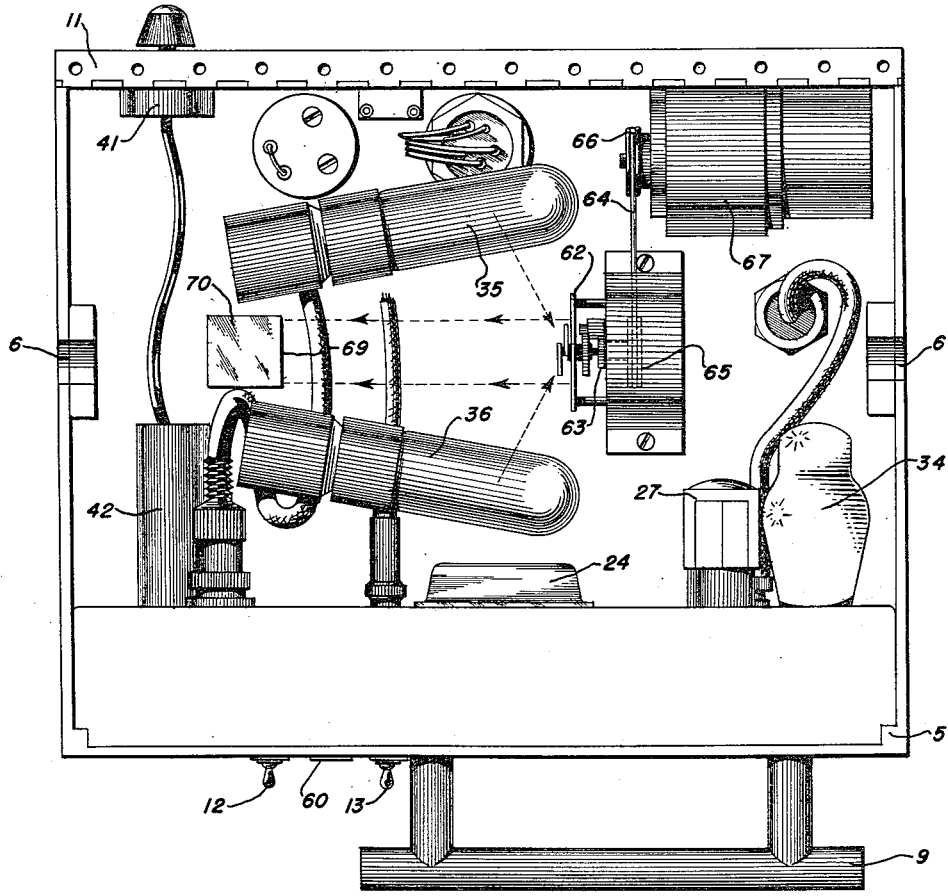
Fig. 2 is a plan of the said case, with its lid removed, to show the contents.

Referring first to Fig. 1, the apparatus comprises a motion-picture camera 1 having a lens 2, preferably of the telephoto type, a synchronous motor 3 for operating said camera at constant speed, and a sighting device such as telescope 4. These parts are mounted on the case 5, which has a suitable notch 6 at each end to permit mounting on a tripod or other support.

The telescope 4 is mounted on the camera 1 by means of the supports 7 and 8 and adjusted to be parallel to the optical axis of the camera, so that the field of view of the telescope will be centered on the same point as the image produced by the camera lens. However, the telescope is not always essential, and in some instances ordinary "open" rifle sights, or even the finder of the camera itself, may be sufficient.

A handle 9 is secured to the case 5 in any desired way. The case has a lid 10, hinged thereto by the piano hinge 11, and closing the case light-tightly, said lid 10 serving as the mounting base of the camera and its adjuncts. Switches 12 and 13 are conveniently mounted on the case to control the associated electrical devices, namely the motor 3, and the electronic apparatus in the case 5.

Referring now to Fig. 3, the tripod for supporting the mechanism just described is illustrated. It comprises a head 20 having the three sockets 21 digidly secured thereto, as by welding, and the three tubular legs 22 threaded or welded into said sockets.

A bearing 23 depends from the head 20 and carries the vertical shaft 18 of a fork having the arms or tines 17 which are spaced apart to receive the case 5 between them as shown. Bolts 14 have their heads engaged with the case 5 by means of the notches 6 therein, forming light-tight joints, and are themselves mounted in suitable ball bearings in the head 15 and secured by the nuts 16, so that by manipulating the handle 9 the whole apparatus may be swung about the axis formed by the two bolts 14, thus setting the same to the correct elevation to sight the target.

The shaft 18 is mounted for motion about its (vertical) axis in the bearing 23, and carries a collar 19 which may be graduated if desired. This shaft 18 thus allows the whole apparatus to turn about a vertical axis, that is, to give it a motion in train, to sight the target.

However, as the only function of the tripod is to support the apparatus at a convenient height, and in such a way that it may be manipulated freely by the operator to sight it on the target, the exact type of head used is not material. For instance the head illustrated is of the type commonly known as the "alt-azimuth" but the equatorial type would serve nearly as well if it happened to be more readily available, or even a simple ball-and-socket joint would serve well.

Figure 4:
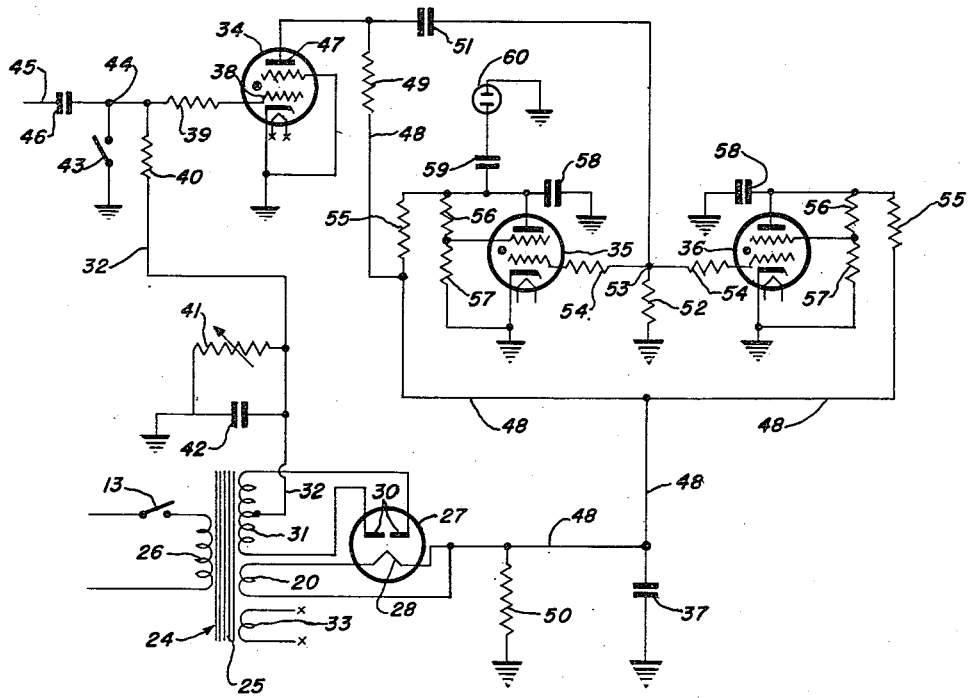
Fig. 4 shows the circuit connecting the electrical devices of Figure 2.

The contents of the case 5, shown pictorially in Fig. 2 and as a conventionalized electric circuit in Fig. 4, will now be described in detail. The power is derived in the first instance from a transformer 24, having an iron core 25 and a primary winding 26, with a switch 13 for controlling the alternating current supplied thereto, in the usual way. A pilot lamp 61 supplied from winding 33 may be provided if desired.

A rectifier tube 27 has its cathode 28 energized from the secondary winding 29, while high voltage alternating power is supplied to the anodes 30 from the winding 31 having the center tap 32 forming the negative side of the direct current supply circuit. The remaining secondary winding 33 supplies cathode heating energy from its terminals xx to the similarly marked terminals of the tube 34.

It will be noted that this power supply differs from the ones customarily used in radio receivers in that it lacks elaborate filtering means, and has only the 8 mfd. capacitor 37 as a reservoir for the direct current energy. This is possible here, because the output is not used to reproduce sound or the like. A bleeder 50, having a resistance of 30,000 ohms, is connected across this capacitor. The bleeder current returns to the tap 32, through the variable resistor 41.

The tube 34 is a thyratron. Its control grid 38 is connected to the negative terminal 32 of the power supply through the two resistors 39 and 40 in series, each being suitably 0.2 megohms in value. Proper bias is supplied to this control grid 38 by the drop due to the bleeder current flowing through the cathode resistor 41, which is suitably a variable resistor having its maximum at 1000 ohms, and which is shunted by the capacitor 42, rated 10 mfd. at 25 volts. The switch 43, by connecting wire 44 to ground, will in effect short-circuit the resistor 41 in such way as to destroy the grid bias when closed. The input circuit of the tube 34 is from wire 45, through the 0.1 mfd. grid capacitor 46 and resistor 39.

The anode 47 of the thyratron 34 is connected to the positive side 48 of the high voltage D. C. supply through the 2 megohm resistor 49, which limits the firing current and also extinguishes the thyratron after each firing. A .01 mfd. capacitor 51 connects the anode 47 to ground through the 1 megohm resistor 52, thus increasing the voltage of point 53 whenever the thyratron fires, due to the surge of current in said capacitor 51.

The tubes 35 and 36 are gas-filled, cold-cathode type tubes, designed to give flashes of light when energized, such as would be used in stroboscopes and the like. As they are alike, and have identical circuits, the same reference characters are applied in duplicate. Each has a grid resistor 54 of 50,000 ohms, a plate resistor 55 of 5000 ohms, and a voltage divider of 150,000 ohms comprising the 50,000 ohm section 56 between plate and outer grid, and the 100,000 ohm section 57 between outer grid and cathode, thus establishing the voltage of the outer grid at approximately two-thirds the plate voltage. A 10 mfd. capacitor 58 is also connected between each plate and cathode.

An indicator circuit is connected between the plate of one of these flash tubes and the ground, here shown as containing the small neon lamp 60 with a 0.1 mfd. capacitor 59 in series therewith. This lamp 60 is located adjacent the eye end of the sighting telescope 4, as shown in Fig. 1, and serves to give a visual indication whenever flashes occur in the tubes 35 and 36, since otherwise there would be no way to tell whether the said flash tubes are operating, inasmuch as they are enclosed in the light-tight box 5.

The flash tubes 35 and 36 are preferably mounted at a slight angle to each other as shown in Fig. 2, so that their combined light may serve to illuminate a dial 62 in front of which move hands operated by a gear-train 63. This train of gears is driven by a belt 64 passing over a pulley 65 in the gear-train and a pulley 66 carried by the shaft of a synchronous motor 67, and acts to reduce the speeds of said hands to values correct for indicating the target ranges on the dials. The motor 67 is itself operated by any suitable range determining means, such as one depending on radar, but itself forming no new feature of the present invention.

Figure 6:
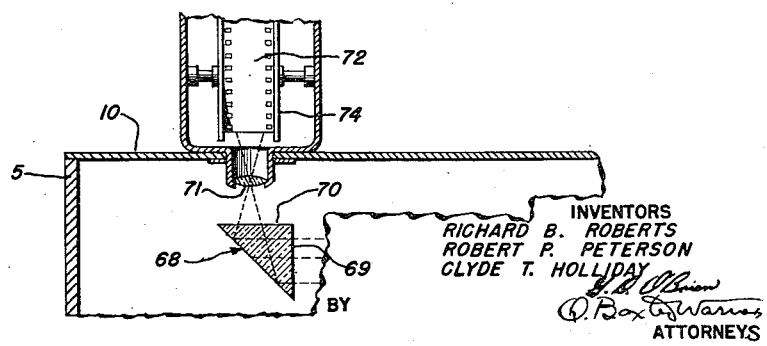
Fig. 6 is a fragmentary detail, showing diagrammatically how the range dial is photographed.

Directly opposite the center of the dial 62 is a 45-degree prism 68 having one of its square faces 69 parallel to the dial 62 and the other square face 70 directed upward, so that the 45-degree reflecting face is in proper position to reflect upward any rays received from the dial. This will be understood upon reference to Fig. 6. The cover 10 of the box 5 has a suitable opening centered directly above the center of the face 70, and a focusable photographic objective 71 is mounted thereon as shown, so that the reflected rays from the range dial will pass through said lens and form an image of the dial and hands on a photographic film 72 coming from the front of the camera and being wound on the take-up reel 73. The film strip, in its passage, travels over the surface of the roller 74, so as to be held at the proper distance from the lens 71 to receive a clearly focused image of the dial and hands.

A photograph of the said parts will thus be made every time the tubes 35 and 36 flash, on the continuously moving film 72. It will be understood that the lens 71 is not the normally-positioned lens of the motion picture camera, but is an additional lens whose sole purpose is to photograph the range dial. The lens 2, on the other hand, is the conventionally located lens which makes successive exposures on the film at uniform time intervals, say twenty per second, in the usual way, the film moving intermittently in the customary loop, in the focal plane of lens 2. Attention is directed also to the fact that there is a definite number of "frames" of the film between the frame being exposed behind the lens 2 at any instant and the portion of the film, not necessarily limited within any single frame, that happens to be in the field of the lens 71 at the same instant and which is ready to receive the image of the range dial. For example, in a device actually made, this amounts to 17 frames, that is, if the tubes 35 and 36 flash and thus cause an image to be impressed on the film, this image will be 17 frames in advance of the frame upon which the lens 2 is at the same time impressing an image of the object at which the camera is directed.

In order to cause the tubes to flash, a suitable impulse must be applied to the control grid 38 of the thyratron 34, sufficient to overcome the bias of said grid and thus allow the thyratron to fire. Such impulses are originated by the apparatus shown in Fig. 5.

Figure 5:
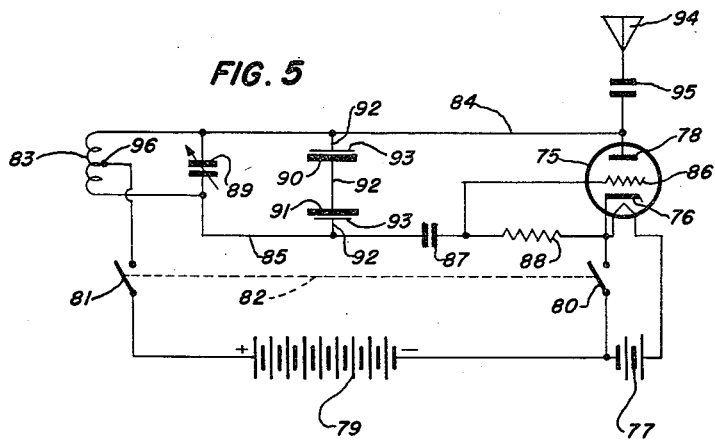
Fig. 5 shows the circuit of the microphones and the radio transmitter located in or near the target.

In Fig. 5, 75 is a triode, having an indirectly heated cathode 76 energized by the battery 77, and a plate 78 supplied with high voltage direct current from any suitable source, such as the B-battery 79. The plate voltage is preferably introduced at the center point 96 of the coil 83, the electrically neutral point, with reference to the high frequency output.

The circuit illustrated is of the ultraudion type and comprises an inductance 83 one terminal of which leads to the plate 78 through conductor 84, while the other is connected to the grid 86 through conductor 85, a stopping capacitor 87 being inserted to keep the B-voltage from reaching the grid. The capacitor 87 may suitably be of about 20 micromicrofarads capacitance, and a grid resistor 88 may connect the grid to the cathode, a suitable value being 50,000 ohms.

A tuning capacitor 89 having a range from 3 to 35 mmfd. may be connected across the coil 83 as shown. Two microphones 90 and 91 are interposed in series with one another in the conductor 92, likewise bridged across the coil 83. These microphones preferably are of the capacitor type, each consisting of a stressed diaphragm 93 adjacent and preferably parallel to a relatively rigid conducting base.

By reason of the tension in each diaphragm, it will possess a natural period of oscillation, that is, each capacitor microphone is resonant to some particular frequency. Reference to the drawing shows that the two microphones will act electrically as two capacitors in series, hence such resultant capacitance, together with the capacitance of tuning capacitor 89, and of course the unavoidable interelectrode capacitances will constitute the capacitance of the oscillation circuit, which, with the inductance of coil 83, determines the frequency.

When either diaphragm 93 is given a sudden displacement, as by a mechanical or acoustic shock, it will be set into vibration at its resonant frequency, and thus the capacitance of the oscillation circuit will likewise fluctuate at the same frequency, resulting in frequency modulation of the output of the oscillator.

An antenna 94 and series capacitor 95 of say 250 mmfd. completes the apparatus for generating, modulating and radiating, high frequency energy from the air-borne circuit just described to the receiving station below.

The operation of the mechanisms and circuits hereinabove described is as follows:

With the camera 1 and box 5 mounted on its tripod and placed adjacent the gun under test, the camera is kept sighted on the target, usually a towed sleeve, and when the latter is within the firing zone, tracer bullets or shells are fired at the rate of about one per second.

The camera thus makes a motion picture of the target and its immediate vicinity. When a bullet or shell passes the plane of the target, its shock wave almost simultaneously strikes the microphones 90—93 associated with said target, and sets the diaphragms 93 into oscillation at their resonant frequencies. The antenna 94 is continually radiating energy, which is received by a suitable receiver of the frequency-modulated type, located near the gun and camera.

When the diaphragms 93, or either of them, oscillate, the frequency emitted by the antenna 94 will be correspondingly altered, as explained before, and thus will correspondingly affect the FM receiver. Suitable filters will usually be provided, to make the response more selective, so that strong signals will be derived from the receiver only when a shock wave thus influences the microphones.

These signals, properly amplified as may be necessary, are fed to the grid 38 of the thyratron 34, and thus cause it to fire whenever the tracer bullet passes the target plane. This in turn causes the tubes 35 and 36 to flash, thus illuminating the range dial 62 momentarily and causing it to be photographed on the moving film 72, through the prism 68 and lens 71.

As the dial 62 continually shows the target range, by virtue of its control through the motor 67, which in turn is responsive to a radar range device or equivalent, this photograph will show the range of the target at the instant the tracer bullet shock wave reached it. The corresponding frame of the film, photographed through the telephoto lens 2, in the usual way, may then be correlated with this, to find out what happened, that is, the accuracy or lack of accuracy of the aiming may be determined.

When extreme exactitude is wanted, consideration must be given to the fact that while the shock wave travels very rapidly, and strikes the microphone almost at the same instant that the bullet passes the target plane, yet the tracer bullet is itself also moving very rapidly, and will travel somewhat past the target plane before the shock wave reaches the microphone, and hence a correction must be applied to take care of this.

In use, the neon indicator 60 adjacent the eyepiece of the telescope 4 will show the operator when and if the tubes 35 and 36 are operating, when the box 5 is closed. When the said box is open, the responsiveness of these tubes may be checked by closing the switch 43, which will also cause the thyratron 34 to fire and should cause the tubes 35 and 36 to flash.

Obviously many modifications and variations of the present invention are possible in the light of the above teachings. It is therefore to be understood that within the scope of the appended claims the invention may be practiced otherwise than as specifically described.

What is claimed is:

Apparatus for recording the position of a projectile with respect to a target at substantially the time of closest approach to each other and simultaneously recording the range of said target measured from the source of the projectile, comprising, a motion-picture camera located near said source of said projectile and mounted to photograph said target and its immediate surroundings including said projectile, a radio transmitter positioned in said target, said transmitter having electrically associated therewith an acoustically-sensitive device, means for actuating said device by a shock wave created by said projectile while in aerial flight and arranged to generate an audio signal impressible on a carrier signal and transmitted by said transmitter, a remotely located receiver for receiving said transmitted signal, said transmitted signal being indicative of substantially the instant of transit of said projectile through the plane of said target, means for providing a visible symbol indicative of the range of said target from said source of said projectile at the instant of transit of said projectile through the plane of said target, and means including a source of light controllable by said signal received by said receiver to illuminate said symbol, means whereby said camera will produce a photographic record showing simultaneously the range of said target from said source of said projectile as shown by said symbol at said instant of transit of said projectile through the plane of said target, and the position of said projectile at the time of closest approach to each other of said target and projectile.

References Cited in the file of this patent

UNITED STATES PATENTS

| Number | Name | Date |
| --- | --- | --- |
| 507,585 | Lewis | Oct. 31, 1893 |
| 1,732,718 | Gluer | Oct. 22, 1929 |
| 1,977,439 | Hammond | Oct. 16, 1934 |
| 2,082,624 | Hagenguth et al. | June 1, 1937 |
| 2,160,006 | Thompson et al. | May 30, 1939 |
| 2,186,013 | Edgerton | Jan. 9, 1940 |
| 2,194,808 | Pooley | Mar. 26, 1940 |
| 2,278,514 | Florman | Apr. 7, 1942 |
| 2,282,957 | Fields | May 12, 1942 |
| 2,385,397 | Blackburn | Sept. 25, 1945 |